A. L. BAUSMAN.

SNOW-PLOW.

No. 7,109. Reissued May 16, 1876.

Witnesses:

L. F. Brous

A. P. Grant.

Inventor:

Abner L. Bausman by John A. Wiedersheim

Atty.

N. PETERS, PHOTO-LITHOGRAPHER, WASHINGTON, D. C.

UNITED STATES PATENT OFFICE.

ABNER L. BAUSMAN, OF MINNEAPOLIS, MINNESOTA.

IMPROVEMENT IN SNOW-PLOWS.

Specification forming part of Letters Patent No. 49,216, dated August 8, 1865; reissue No. 7,109, dated May 16, 1876; application filed April 24, 1875.

*To all whom it may concern:*

Be it known that I, ABNER L. BAUSMAN, of Minneapolis, in the county of Hennepin and State of Minnesota, have invented a new and useful Improvement in Snow-Plows; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
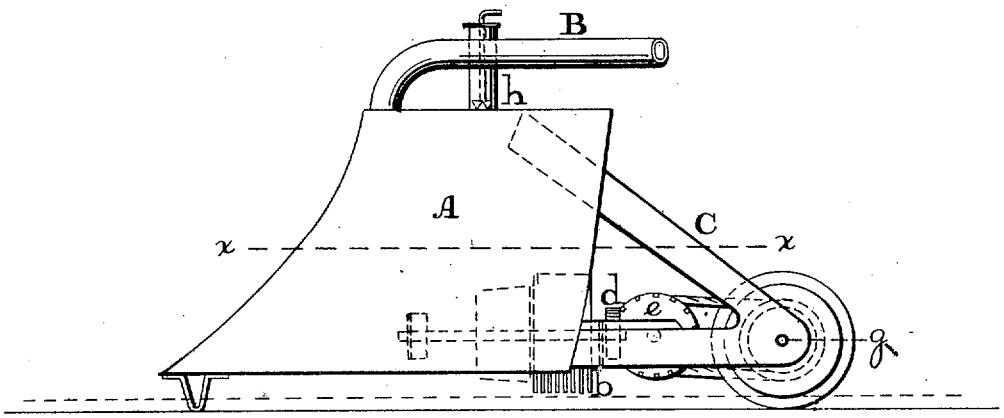
Figure 2:
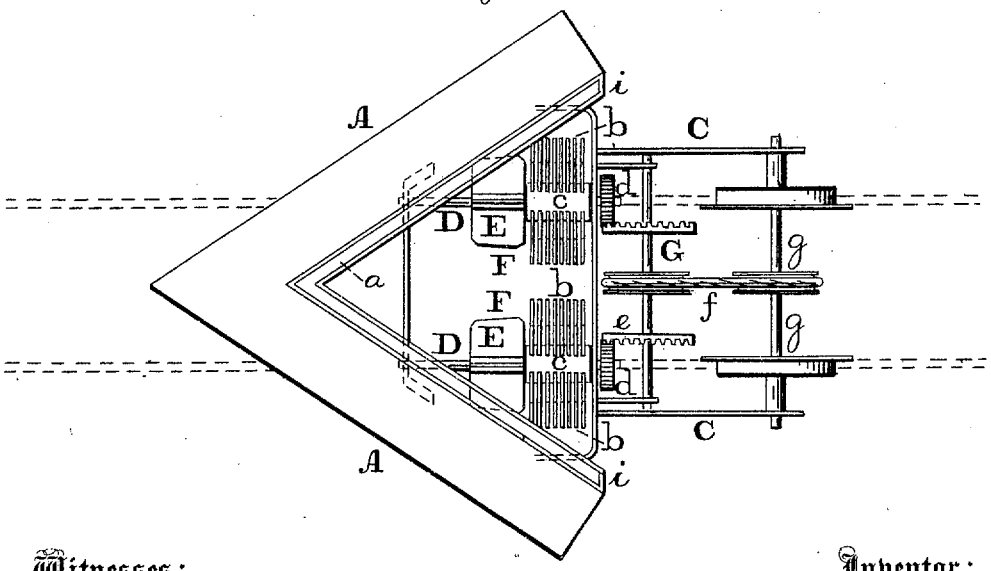

Figure 1 is a side view of the device embodying my invention. Fig. 2 is a horizontal section thereof in line *x x*, Fig. 1.

Similar letters of reference indicate corresponding parts in the two figures.

My invention relates to a device for removing snow from railways. It consists in constructing the plow or device with mold-boards or wings, having double walls which form a chamber for steam or hot air, by which the mold-board or wings may, when the plow is in use, be kept in a heated state, and the snow prevented from adhering thereto. It also consists of rotary blades, which are located at the rear of the plow so as to extend over the rails, and thus shovel snow therefrom, in combination with rotary brushes, likewise located at the rear of the plow so as to extend over the rails, and thus sweep the snow therefrom, a shovel and brush for each rail being mounted on the same axis, whereby the advance plow separates the bank of snow, the shovels remove the solid portions of the snow left on the rails, and the brushes clean the rails of the loose particles, the motion of the shovels and brushes being at a right angle to the line of the rails.

Referring to the drawings, A A represent two mold-boards or wings, which are arranged or placed in V form, the angle formed by their junction being over the center of the space between the two lines of rails of the road, the wings projecting some distance over the rails. These wings are constructed with double walls, so as to form a space or chamber, *a*, between them, into which steam or hot air is to be admitted. To the plow there is secured a framing, C, constructed in any proper manner, to support two shafts, D D, parallel with and directly over the two lines of rails of the road. These shafts D D carry radial blades E, which may be of cast metal or heavy rolled metal plates—four blades to each shaft will probably be sufficient. These blades serve the office of shovels. On the shafts D there are secured brushes F, which are constructed of flat wires *b*, driven or otherwise fitted in wooden cylinders *c*. These brushes, however, may be constructed in various ways. On each shaft D there is keyed a pinion, *d*, and these pinions gear with wheels *e e* on a shaft, G, which receives motion by a belt, *f*, or by gearing from the axle *g*, when the plow advances. The plow removes and casts aside the superincumbent mass in front. The shafts D D rotate and impart rotary motion to the blades, and the snow on top of the rails will be shoveled to the side thereof. The brushes cleanly sweep the snow from the track to the side thereof. In consequence of keeping the mold-boards or wings in a warm or heated state by means of the steam or hot air introduced thereinto, into the space *a*, the snow is prevented from adhering thereto and caused to slide freely off, thereby enabling the plow to work efficiently at all times. A safety-valve may be employed at the top of the plow, or the rear of the wings may be perforated with small holes *i*, for the escape of the steam or hot air.

Having thus described my invention, what I claim as new, and desire to secure by Letters Patent, is—

1. A snow-plow for railroads, constructed with double walls, to admit of a steam or hot-air chamber between its exterior surfaces, for the purpose of keeping said surfaces in a heated state, substantially as set forth.

2. Rotary shovels, in combination with rotary brushes, placed at the rear of a plow and over the two lines of rails, the shovel and brush for each rail being mounted on the same shaft D, and operating substantially as and for the purpose set forth.

ABNER L. BAUSMAN.

Witnesses:

GEO. H. KEITH,

ALBERT A. KEITH.